(12) United States Patent
Sato et al.

(10) Patent No.: US 9,065,174 B2
(45) Date of Patent: Jun. 23, 2015

(54) WIRELESS COMMUNICATION IMPROVING SHEET BODY, IC TAG FOR WIRELESS COMMUNICATION AND METHOD OF MANUFACTURING THE SAME, INFORMATION TRANSMITTING MEDIUM AND WIRELESS COMMUNICATION SYSTEM

(75) Inventors: Shinichi Sato, Yamatokooriyama (JP); Takahiko Yoshida, Yamatokoriyama (JP); Toshiharu Shimai, Yamatokoriyama (JP); Masato Matsushita, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 475 days.

(21) Appl. No.: 12/998,252

(22) PCT Filed: Sep. 30, 2009

(86) PCT No.: PCT/JP2009/067104
§ 371 (c)(1),
(2), (4) Date: Mar. 30, 2011

(87) PCT Pub. No.: WO2010/038813
PCT Pub. Date: Apr. 8, 2010

(65) Prior Publication Data
US 2011/0180609 A1 Jul. 28, 2011

(30) Foreign Application Priority Data
Sep. 30, 2008 (JP) ................................. 2008-255754

(51) Int. Cl.
*H04Q 5/22* (2006.01)
*G08B 13/14* (2006.01)
(Continued)

(52) U.S. Cl.
CPC ......... *H01Q 1/2208* (2013.01); *Y10T 29/49124* (2015.01); *G06K 19/07749* (2013.01);
(Continued)

(58) Field of Classification Search
USPC .............. 340/10.1–10.4, 572.1, 572.7, 572.8; 235/435
See application file for complete search history.

(56) References Cited

U.S. PATENT DOCUMENTS 6,163,260 A * 12/2000 Conwell et al. ............ 340/572.8
6,255,995 B1 7/2001 Asano et al.
(Continued)

FOREIGN PATENT DOCUMENTS

CN 1926933 3/2007
CN 101286206 10/2008
(Continued)

OTHER PUBLICATIONS

Decision of Refusal for corresponding Japanese patent application No. 2010-531899 dated Jan. 8, 2013 with English translation.
(Continued)

*Primary Examiner* — Daniell L Negron
*Assistant Examiner* — Mohamed Barakat
(74) *Attorney, Agent, or Firm* — Harness, Dickey & Pierce, P.L.C.

(57) ABSTRACT

A first spacer has an arrangement surface on which a wireless IC tag is arranged, and an auxiliary antenna that resonates with electromagnetic wave used for wireless communication is provided on a surface opposite to the arrangement surface of the first spacer. A second spacer is provided opposite to the first spacer with the auxiliary antenna interposed therebetween. The first spacer and the auxiliary antenna are provided with a groove (opening) as an adjuster for resonance frequency so that the second spacer forms a bottom of the groove. Application to a plurality of communication frequencies is made possible by changing an arrangement position of the wireless IC tag with respect to the adjuster.

2 Claims, 11 Drawing Sheets

(51) Int. Cl.
*G06K 21/06* (2006.01)
*H01Q 1/38* (2006.01)
*H01Q 5/00* (2006.01)
*H01Q 9/04* (2006.01)
*H01Q 9/16* (2006.01)
*H01Q 19/00* (2006.01)
*H01Q 19/10* (2006.01)
*H01Q 1/22* (2006.01)
*G06K 19/077* (2006.01)
*H01Q 1/40* (2006.01)
*H01Q 9/26* (2006.01)
*H01Q 15/14* (2006.01)
*H01Q 1/48* (2006.01)
*H01Q 7/00* (2006.01)
*H01Q 13/08* (2006.01)
*H01Q 13/10* (2006.01)

(52) U.S. Cl.
CPC . *H01Q1/40* (2013.01); *H01Q 9/26* (2013.01); *H01Q 15/14* (2013.01); *H01Q 1/2225* (2013.01); *H01Q 1/48* (2013.01); *H01Q 7/00* (2013.01); *H01Q 13/085* (2013.01); *H01Q 13/10* (2013.01); *H01Q 19/10* (2013.01)

(56) References Cited

U.S. PATENT DOCUMENTS

| | | | |
|---|---|---|---|
| 7,963,451 B2 * | 6/2011 | Kawai | 235/492 |
| 2005/0093678 A1 | 5/2005 | Forster et al. | |
| 2005/0140512 A1 * | 6/2005 | Sakama et al. | 340/572.7 |
| 2007/0096852 A1 * | 5/2007 | Lawrence et al. | 333/195 |
| 2007/0252771 A1 | 11/2007 | Maezawa et al. | |
| 2008/0036673 A1 | 2/2008 | Yamagajo et al. | |
| 2008/0084259 A1 | 4/2008 | Yoshida et al. | |
| 2008/0122704 A1 * | 5/2008 | King | 343/702 |
| 2008/0252462 A1 | 10/2008 | Sakama | |
| 2009/0009007 A1 | 1/2009 | Kato et al. | |
| 2010/0035539 A1 | 2/2010 | Yoshida et al. | |
| 2010/0052992 A1 | 3/2010 | Okamura et al. | |
| 2010/0231482 A1 | 9/2010 | Yoshida et al. | |

FOREIGN PATENT DOCUMENTS

| | | |
|---|---|---|
| JP | 09-232855 | 9/1997 |
| JP | 2000-223933 | 8/2000 |
| JP | 3695123 | 9/2005 |
| JP | 2007-124638 | 5/2007 |
| JP | 2007-143132 | 6/2007 |
| JP | 2007143132 A * | 6/2007 |
| JP | 2007-325054 | 12/2007 |
| JP | 2008/067342 | 3/2008 |
| JP | 2009-135867 | 6/2009 |
| JP | 2009-282968 | 12/2009 |
| WO | WO 02/07085 | 1/2002 |
| WO | WO 2007/000578 | 1/2007 |
| WO | WO 2006/059771 | 6/2007 |
| WO | WO 2007/125752 | 11/2007 |
| WO | WO 2009/057335 | 5/2009 |

OTHER PUBLICATIONS

International Preliminary Report on Patentability for international patent application No. PCT/JP2009/067104 dated May 19, 2011 (with English translation).
International Search Report dated Dec. 28, 2009.
Second Office Action for corresponding Chinese patent application No. 200980138612.4 dated Aug. 15, 2013 with English translation of main text of Office Action.
Extended European Search Report for corresponding European patent application No. 09817845.2 dated Nov. 4, 2013.
Taiwanese Office Action and English translation thereof dated Sep. 19, 2014.

* cited by examiner

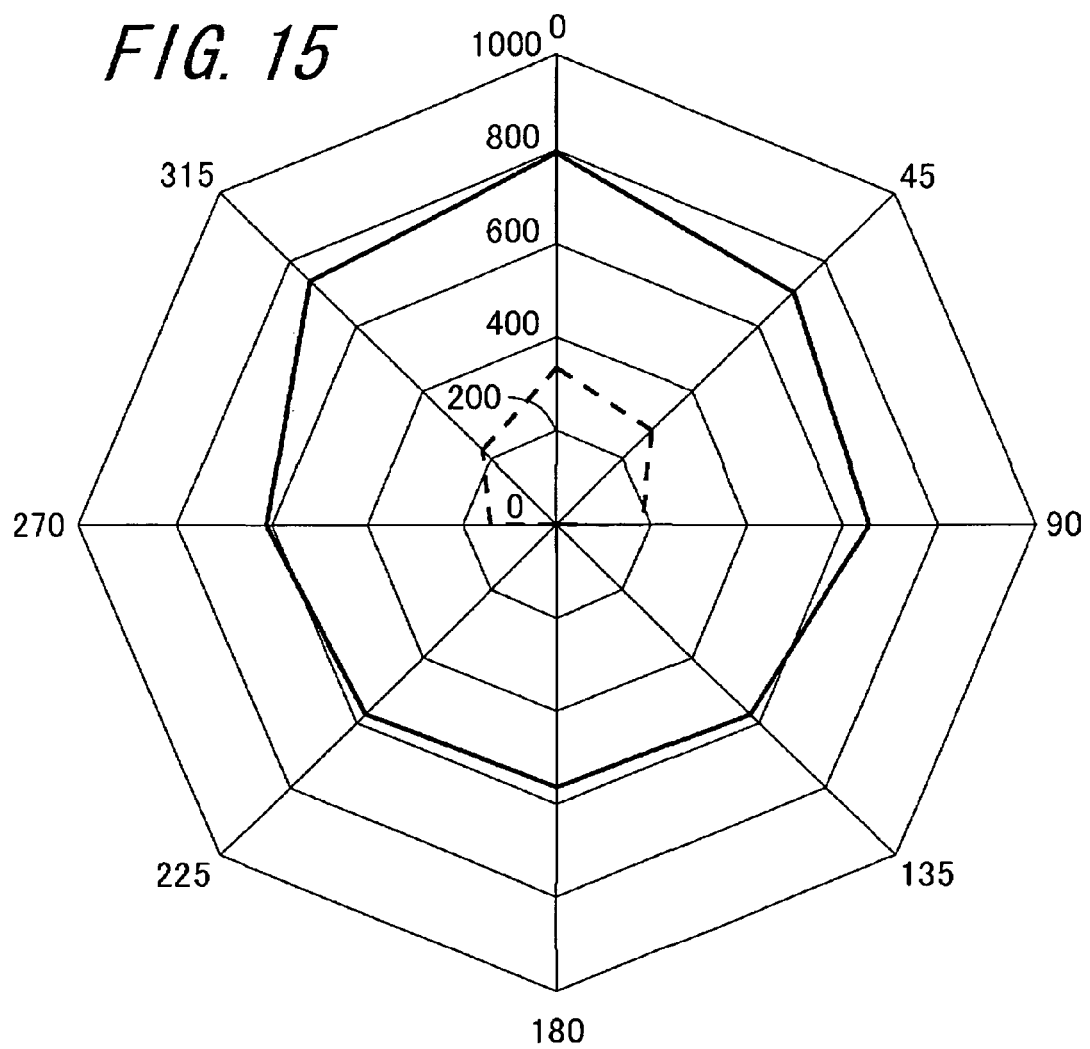

WIRELESS COMMUNICATION IMPROVING SHEET BODY, IC TAG FOR WIRELESS COMMUNICATION AND METHOD OF MANUFACTURING THE SAME, INFORMATION TRANSMITTING MEDIUM AND WIRELESS COMMUNICATION SYSTEM

TECHNICAL FIELD

The present invention relates to a wireless communication improving sheet body capable of increasing possible communication distance of an IC tag for wireless communication, the IC tag for wireless communication and a method of manufacturing the same, an information transmitting medium and a wireless communication system.

BACKGROUND ART

Wireless communication technology is applied to the field of physical distribution management as well as that of information and communication. An IC tag for wireless communication (hereinafter simply referred to as "IC tag") is well known as a product playing a role in an RFID (Radio Frequency Identification) technology. Since the IC tag is used in wide-ranging applications including physical distribution management and low-cost information storage medium, wireless communication equipment is used in various environments.

The IC tag includes a chip for storing data such as an identification number and an antenna for transmitting and receiving radio wave, which can be highly advantageously implemented in a thin and lightweight form. The IC tag may also be referred to as RFID tag or RF tag.

In order to make full use of the advantage, it would be desirable that the tag can be applied anywhere without limitation and is configured to be in communication no matter where and how the tag is applied.

However, the IC tag is designed to be used in free space. When radio wave in a very high frequency band, an ultra-high frequency band or a microwave band is used, a general-purpose tag performs transmission and reception in radio wave communication using what is called a dipole antenna. When a metal or the like exists near the antenna, the communication properties of the antenna is degraded, shortening the possible communication distance.

When a conductive material such as a metal exists near the antenna, a current flowing in the antenna induces a current flowing in the opposite direction in the metal, the induced current largely decreasing the input impedance of the antenna. This results in impedance mismatching with an IC chip designed for free space, shortening the possible communication distance. Also, when another current having the same amount exists near the current almost in parallel and the opposite direction, the direction of magnetic field generated around the current is opposite to that generated around the another current, the magnetic fields canceling each other, which prevents radio wave from being transmitted in long distance, i.e., shortening the possible communication distance.

Typically, a dipole antenna, a monopole antenna and a loop antenna are designed to be matched with the chip impedance in free, space when a resonance current flows in the IC chip that is generated in the antenna in response to receiving radio wave at a particular frequency.

FIG. 12 is a cross-sectional view showing a magnetic field generated near a wireless IC tag 20 that is located close to a conductive member.

When a communication disturbing member 112 exists near an antenna element 111, a current I11 flows to one end 111a from the other end 111b of the antenna element 111, and a current I12 flows from one portion 112a to the other portion 112b of the communication disturbing member 112, resulting in the currents flowing in the directions opposite to each other in the antenna element 111 and the communication disturbing member 112.

Since an alternating current is applied by an IC 117, a state that the currents flowing in the directions shown and a state of the currents flowing in the directions opposite to the shown directions occur alternately. FIG. 12 shows the directions of the currents generated at a given instant. When the frequency increases, a state occurs that is equivalent to that in which a current I0 flows between the one end 111a of the antenna element 111 and the one portion 112a of the communication disturbing member 112 and between the other end 111b of the antenna element 111 and the other portion 112b of the communication disturbing member 112. This state can be considered as that in which the one end 111a of the antenna element 111 and the one portion 112a of the communication disturbing member 112 are short-circuited in a high frequency manner, and also, the other end 111b of the antenna element 111 and the other portion 112b of the communication disturbing member 112 are short-circuited with respect to high frequency. When these short circuits with respect to high frequency occur, the antenna element 111 and the communication disturbing member 112 form a closed circuit, increasing the amount of the current in comparison with the case without the communication disturbing member 112 in the vicinity of the antenna element. In other words, the impedance decreases in comparison with the case without the communication disturbing member 112 near the antenna element 111.

Thus, when a conductive material exists near an antenna or chip, a current is induced on the surface of the conductive material in the direction opposite to that in which a current flows in the antenna, and furthermore, a high electric-field portion of the antenna and a low electric-field portion of the opposite surface of the conductive material, and a low electric-field portion of the antenna and a high electric-field portion of the opposite surface of the conductive material become connected with respect to high frequency, which generates a loop electric circuit of the antenna and the conductive material. The generation of the electric circuit significantly decrease the impedance, which causes a mismatch with the chip impedance, disabling information signal communication. This shortens the possible communication distance.

In addition to the metal, paper, glass, resin, liquid and the like may be a material that degrades the communication properties of the IC tag.

For these materials, the dielectric and magnetic properties of them cause the resonance frequency of the antenna to be changed, the difference between the frequency of radio wave used by the other communication party and the changed resonance frequency of the antenna shortens the possible communication distance.

Patent Literature 1 discloses an RFID tag including a power supply pattern with an LSI chip thereon; a patch antenna that operates as a tag antenna and a high-frequency coupler for coupling the power supply pattern and the patch antenna with respect to high frequency.

CITATION LIST

Patent Literature

Patent Literature 1: Japanese Unexamined Patent Publication JP-A 2008-67342

DISCLOSURE OF INVENTION

Technical Problem

An RFID tag with a patch antenna which is described in Patent Literature 1, is not affected by the properties of a material on the ground side due to the patch antenna, so the possible communication distance is not shortened even when the tag is applied to an object including a metal or liquid, and by adjusting the thickness of the antenna, the dielectric constant of the metal, the loss of the dielectric and the like, the gain of the patch antenna can be increased, with a result that the RFID can be downsized and be made thinner.

On the other hand, as shown in FIGS. 8 and 9 of Patent Literature 1, the patch antenna has a problem of narrow frequency bandwidth in which the gain is rapidly decreased when the frequency is deviated from the resonance frequency. Although the patch antenna can operate even in the vicinity of a metal, the patch side length as resonance size needs to be $\lambda/2$, where $\lambda$ denotes a wavelength at the resonance frequency, making the antenna too large for the use in a compact product. Also, an IC chip needs to be mounted on the patch antenna. In order for an IC tag usable near a metal to meet the need for small quantity and large variety, designing the patching position and machining for mounting is required, which increases design time and cost.

For example, for a wireless IC tag for UHF band with the patch antenna, allocated communication frequencies are different among countries, such as 902 to 928 MHz for US, 952 to 954 MHz for Japan, 910 to 915 MHz for Korea and 866 to 868 MHz for EU. Thus, when using the patch antenna, the wireless IC tag needs to be individually manufactured for each country in which the tag is used, that is, for each frequency used, by changing the dimension or material of the antenna or the like.

It is an object of the invention to provide a wireless communication improving sheet body, an IC tag for wireless communication and a method of manufacturing the same, an information transmitting medium and a wireless communication system that can increase the possible communication distance of the IC tag for wireless communication and can be applied to a plurality of communication frequencies.

It is another object of the invention to provide a sheet body having a general purpose property such that wireless communication properties can be improved just by attaching a wireless IC tag to the sheet body.

Solution to Problem

The invention provides a wireless communication improving sheet body capable of improving wireless communication properties of a wireless IC tag or wireless IC tag component mounted thereon, the wireless communication improving sheet body comprising:
a first spacer having an arrangement surface on which the wireless IC tag or wireless IC tag component is arranged without wire connection;
an auxiliary antenna provided on a surface opposite to the arrangement surface of the first spacer; and
a second spacer provided opposite to the first spacer with the auxiliary antenna interposed therebetween so that the first spacer, the auxiliary antenna and the second spacer stack one another,
the auxiliary antenna being provided with an opening or notch which is served as an adjuster for adjusting resonance frequency of the wireless IC tag.

Furthermore, in the invention, it is preferable that the auxiliary antenna includes one or more conductive layers, and at least one of the conductive layers is a resonance layer that resonates with electromagnetic wave used for wireless communication.

Furthermore, in the invention, it is preferable that the auxiliary antenna includes a plurality of conductive layers arranged in a planar direction or stacked direction thereof, and at least one of the plurality of conductive layers is a resonance layer that resonates with electromagnetic wave used for wireless communication.

Furthermore, in the invention, it is preferable that the wireless communication improving sheet body further comprises a back side conductive layer provided on an opposite side of the second spacer to the auxiliary antenna.

Furthermore, in the invention, it is preferable that the wireless communication improving sheet body further comprises a back side conductive layer provided on an opposite side of the second spacer to the auxiliary antenna, and the back side conductive layer is of a same size as or larger than that of the conductive layer included in the auxiliary antenna.

Furthermore, in the invention, it is preferable that the first spacer, the second spacer, the auxiliary antenna and the back side conductive layer each include a part which serves as an adjuster for adjusting resonance frequency of the wireless IC tag by changing a material, shape and arrangement of the part.

Furthermore, in the invention, it is preferable that the opening or notch of the auxiliary antenna as the adjuster is provided so as to be opposite at least to an IC chip or reactance loading area included in the wireless IC tag or wireless IC tag component when the wireless IC tag or wireless IC tag component is arranged.

Furthermore, in the invention, it is preferable that at least one of the first spacer and the second spacer is composed of a foamed body.

Furthermore, in the invention, it is preferable that part or entirety of an outer surface of the sheet body is covered with a dielectric material.

Furthermore, in the invention, it is preferable that at least one of the arrangement surface and the surface opposite to the arrangement surface is sticky or adhesive.

Furthermore, the invention provides a method for manufacturing an IC tag for wireless communication, comprising arranging a wireless IC tag or wireless IC tag component on an arrangement surface of a wireless communication improving sheet body mentioned above to manufacture the IC tag for wireless communication, the method for manufacturing an IC tag for wireless communication comprising:
determining an arrangement position of the wireless IC tag or wireless IC tag component with respect to the adjusters of the wireless communication improving sheet body according to a communication frequency of the wireless IC tag; and
arranging the wireless IC tag or wireless IC tag component at the arrangement position determined.

Furthermore, the invention provides an IC tag for wireless communication, comprising:
the wireless communication improving sheet body mentioned above; and
a wireless IC tag or wireless IC tag component arranged on an arrangement surface of the wireless communication improving sheet body, or an IC chip coupled to the wireless communication improving sheet body.

Furthermore, the invention provides an information transmitting medium comprising the wireless communication improving sheet body or IC tag for wireless communication mentioned above that is built into the information transmitting medium.

Furthermore, the invention provides a wireless communication system comprising the IC tag for wireless communication or information transmitting medium mentioned above.

Advantageous Effects of Invention

According to the invention, a wireless communication improving sheet body that can improve wireless communication properties of a wireless IC tag mounted thereon and can be applied to a plurality of communication frequencies.

The wireless communication improving sheet body is an auxiliary antenna that can improve communication independently of the type of an target object just by stacking a commercially available wireless IC tag or wireless IC tag component or customized wireless IC tag component. The wireless communication improving sheet body can achieve impedance matching and resonance frequency adjustment under the condition such that communication of radio wave signals between the auxiliary antenna and the IC chip of the wireless IC tag or wireless IC tag component is performed through the electromagnetic field distribution in a space or medium without using conductive wiring, wire connection, soldering or the like process.

The first spacer has an arrangement surface on which the wireless IC tag or wireless IC tag component is arranged, and the auxiliary antenna is provided on the surface opposite to the arrangement surface of the first spacer. The second spacer is provided opposite to the first spacer with the auxiliary antenna interposed therebetween.

The auxiliary antenna is provided with an opening or notch.

This enables an antenna of the wireless IC tag or the wireless IC tag component and the auxiliary antenna to be electromagnetically coupled through the opening or notch, allowing the auxiliary antenna to improve communication properties.

Furthermore, the opening or notch is served as an adjuster for adjusting resonance frequency of the wireless IC tag. Application to a plurality of communication frequencies is made possible by changing the material or shape of the adjuster or by changing the arrangement position of the wireless IC tag or wireless IC tag component with respect to the adjuster.

Furthermore, according to the invention, the auxiliary antenna includes one or more conductive layers, at least one of the conductive layers being a resonance layer that resonates with electromagnetic wave used for wireless communication.

Resonating with electromagnetic wave used for wireless communication allows the auxiliary antenna to perform wireless communication, improving communication properties.

Furthermore, according to the invention, the auxiliary antenna includes a plurality of conductive layers arranged in the planar direction or stacked direction, at least one of the plurality of conductive layers being the resonance layer that resonates with electromagnetic wave used for wireless communication.

Having another conductive layer in addition to the resonance layer that resonates with electromagnetic wave used for wireless communication or arranging a plurality of resonance layers allows adding impedance adjustment function and widening wireless communication band, improving communication properties.

Furthermore, according to the invention, a back side conductive layer is further provided opposite to the auxiliary antenna with the second spacer interposed therebetween. This can reduce the influence of the arrangement position (and type of material) of the wireless communication improving sheet body.

Furthermore, according to the invention, a conductive layer is provided on an opposite side of the second spacer to the auxiliary antenna, and the conductive layer is larger than that of the conductive layer included in the auxiliary antenna. This can more surely reduce the influence of the arrangement position (and type of material) of the wireless communication improving sheet body.

Furthermore, according to the invention, the first spacer, the second spacer, the auxiliary antenna and the back side conductive layer each include a part which serves as the adjuster, and the resonance frequency can be adjusted by changing the material, shape and arrangement of the part.

Furthermore, according to the invention, the opening or notch as the adjuster is provided so as to be opposite at least to an IC chip or reactance loading area included in the wireless IC tag or wireless IC tag component when the wireless IC tag or wireless IC tag component is mounted.

This can reduce the influence of the auxiliary antenna as conductive material to further improve communication properties, allowing resonance frequency adjustment.

Furthermore, according to the invention, at least one of the first spacer and the second spacer is composed of a foamed body.

Using the foamed body can make the wireless communication improving sheet body lightweight and thin.

Furthermore, according to the invention, part or entirety of an outer surface of the sheet body is covered with a dielectric material.

This can reduce the influence of undesired electromagnetic wave from the outside and the influence from the surrounding environment to further improve communication properties and giving waterproof, shock resistance and insulation.

Furthermore, according to the invention, at least one of the arrangement surface and the surface opposite to the arrangement surface is sticky or adhesive.

This facilitates mounting the wireless IC tag and attaching the wireless IC tag to the target product.

Furthermore, according to the invention, there is provided a method for manufacturing an IC tag for wireless communication, comprising arranging a wireless IC tag or wireless IC tag component on an arrangement surface of a wireless communication improving sheet body to manufacture the IC tag for wireless communication, the method comprising determining an arrangement position of the wireless IC tag or wireless IC tag component with respect to the adjusters of the wireless communication improving sheet body according to a communication frequency of the wireless IC tag, and arranging the wireless IC tag or wireless IC tag component at the arrangement position determined.

Since the resonance frequency changes according to the arrangement position of the wireless IC tag with respect to the adjusters, an IC tag for wireless communication for the communication frequency specified by each country in which the IC tag is to be used can be easily manufactured just by changing the arrangement position of the wireless IC tag or wireless IC tag component on the sheet body.

Furthermore, according to the invention, the IC tag for wireless communication comprises the sheet body and a wireless IC tag or wireless IC tag component mounted on an arrangement surface of the wireless communication improving sheet body, or an IC chip coupled to the wireless communication improving sheet body.

Since the wireless communication improving sheet body is integrated into the wireless IC tag, wireless communication can be performed independently of installation location and attachment location. Furthermore, directly attaching the IC chip to the wireless communication improving sheet body makes the IC tag for wireless communication more simple and compact and adapted to a communication disturbing member such as a metal.

Furthermore, according to the invention, an information transmitting medium comprises the wireless communication improving sheet body or the IC tag for wireless communication that is built into the information transmitting medium.

Examples of the information transmitting medium include a notebook, baggage tag, name plate, instruction, slip, certificate, card and label.

The wireless IC tag communication can be performed even when the information transmitting medium such as a notebook, baggage tag, name plate, instruction, slip, certificate, card or label is directly attached to a product, interim product, part or material including metallic, conductive or high-dielectric materials, or a vessel, carrier or moving means composed of any of the above-described materials.

Furthermore, according to the invention, using the above IC tag for wireless communication or the above information transmitting medium can provide a wireless communication system free from misreading and failed reading.

BRIEF DESCRIPTION OF DRAWINGS

Other and further objects, features, and advantages of the invention will be more explicit from the following detailed description taken with reference to the drawings wherein:

FIG. 15 is a view showing measurement results for Example 4 and Comparative Example.

DESCRIPTION OF EMBODIMENTS

Figure 1:
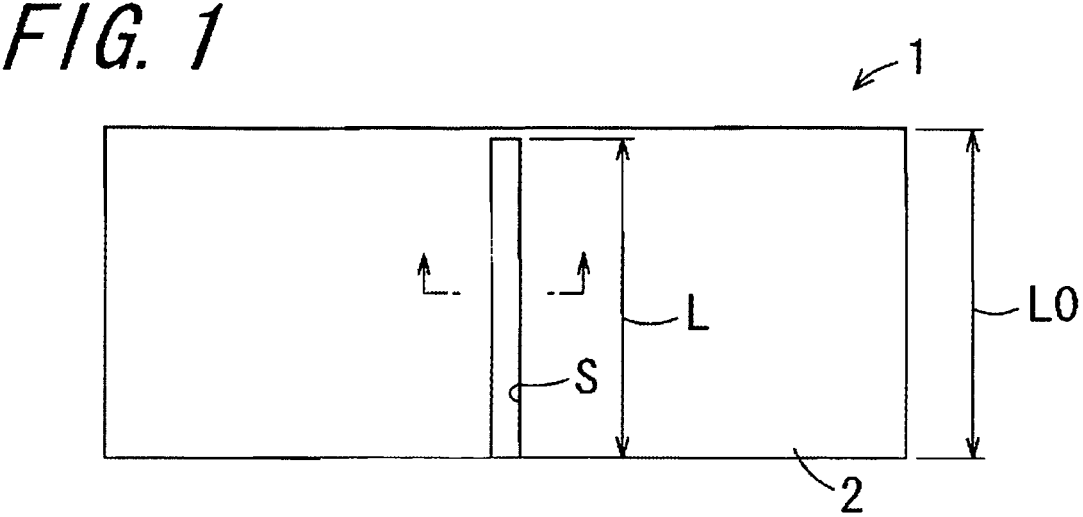
FIG. 1 is a plan view of a sheet body 1 according to a first embodiment of the invention.

Preferable embodiments of the invention are described below in detail with reference to the drawings.

The invention provides a wireless communication improving sheet body (hereinafter simply referred to as "sheet body") that can improve wireless communication properties of a wireless IC tag by having the wireless IC tag mounted thereon and can be applied to a plurality of communication frequencies.

A sheet body of the invention comprises a first spacer having an arrangement surface on which a wireless IC tag or wireless IC tag component is arranged without wire connection, an auxiliary antenna provided on a surface opposite to the arrangement surface of the first spacer, and a second spacer provided opposite to the first spacer with the auxiliary antenna interposed therebetween, so that the first spacer, the auxiliary antenna and the second spacer stack one another, the auxiliary antenna being provided with an opening or notch which is served as an adjuster for adjusting resonance frequency of the wireless IC tag.

As suggested in the related art, combining the wireless IC tag or wireless IC tag component including a dipole antenna, monopole antenna and loop antenna with the auxiliary antenna having a patch antenna configuration including two conductive layers in a resonance layer and a ground layer can suppress the effect of a communication disturbing member such as a conductive member such as a metal in the ground layer and can ensure the resonance in the resonance layer. Therefore, the resonance may be utilized to improve communication of the wireless IC tag.

However, the patch antenna has a narrow band characteristic in which the gain is rapidly decreased when the frequency is deviated from the resonance frequency. Thus, the wireless IC tag needs to be individually manufactured for each country in which the tag is used, that is, for each frequency used, by changing the dimension or material of the patch antenna or the like.

In the invention, application to a plurality of communication frequencies is made possible by providing the adjuster for adjusting the resonance frequency of the wireless IC tag.

First, a function of the sheet body of the invention that improves wireless communication properties is described. The invention enables the improvement of the communication of the wireless IC tag by providing an opening (slot) or notch (slit) in the auxiliary antenna.

The antenna of the wireless IC tag or wireless IC tag component and the auxiliary antenna are magnetically coupled to each other through the opening or notch to enable wireless communication by the auxiliary antenna, thereby increasing the possible communication distance.

With the opening or notch provided in the auxiliary antenna, an electric field along a long axis direction of antenna shape of the antenna is generated at the opening or notch in response to the resonance operation of the antenna. This electric field activates the magnetic coupling between the antenna (and the IC chip) and the auxiliary antenna. In addition, the opening or notch increases the electric resistance of a conductive plate, allowing a current induced by the antenna on the conductive plate to be reduced.

The auxiliary antenna of the invention is different from the patch antenna in the following points. In addition to the structural difference of having the opening or notch as adjuster in a resonance plate, the auxiliary antenna has a function of sending/receiving electromagnetic energy to/from the wireless IC tag or wireless IC tag component through the adjuster configured by the opening or notch without wire connection and also paths for transferring information to/from the IC chip are superposed inside the auxiliary antenna, to enable the operation mechanism of sending/receiving electromagnetic energy to/from the wireless IC tag or wireless IC tag component in the vicinity as well as conventional antenna operation for long distance.

The auxiliary antenna of the invention is configured to resonate at a wireless communication frequency in the combination with the wireless IC tag or wireless IC tag component. The resonance layer of the auxiliary antenna has a resonance part having a dimension in a range of $\lambda/8$ to $3\lambda/4$, where $\lambda$ denotes a wavelength of radio wave at the wireless communication frequency.

The sheet body of the invention can improve the communication of the wireless IC tag or wireless IC tag component just by attaching the sheet body to the wireless IC tag or wireless IC tag component. Commercially available wireless IC tags have different chip impedances depending on their individual design. These impedances differ between in static state and in operational state and, even in operational state, differ depending on the amount of received energy. The wireless communication improving sheet body of the invention has an advantage that impedance matching and improvement can be achieved just by attaching the sheet body to the wireless IC tag having thus unstable and variable impedance. By the impedance adjustment function given by the auxiliary antenna and the adjuster, wireless communication can be improved and application to a plurality of communication frequencies is made possible.

The first and second spacers, the auxiliary antenna and a back side conductive layer each include a part which serves as the adjuster included in the sheet body of the invention. The auxiliary antenna includes a conductive layer in which an opening or notch is provided. Note that the back side conductive layer is not needed when the sheet body is attached to the surface of a material that also acts as the back side conductive layer, such as the surface of a metal. The auxiliary antenna only need to have at least one resonance part and may have a plurality of non-resonance conductive parts or conductive parts that resonate at other frequencies. The number of the opening or notch may be one or more. A combination of the opening(s) and the notch(es) may exist. The opening or notch is in any shape to be determined according to a function requirement such as electromagnetic coupling.

In configuring the adjuster, it is important to determine the position of the IC chip of the wireless IC tag or wireless IC tag component to be arranged opposite to the opening or notch of the auxiliary antenna. The impedance changes depending on the arrangement position. Based on this relation, the wireless IC tag tuned to any frequency can be manufactured.

The radiation characteristic of the wireless IC tag is also affected by the size of the auxiliary antenna and the back side conductive layer. When the back side conductive layer is larger than the auxiliary antenna as resonance part, the amount of the electric field reaching the back side of the back side conductive layer from the resonating auxiliary antenna is small, which results in sharpening the radio wave directivity toward the direction perpendicular to an imaginary plane including the auxiliary antenna surface. When the auxiliary antenna is as large as the back side conductive layer, the electric field generated from the top surface of the auxiliary antenna reaches the back side of the back side conductive layer, then the amount of the electric field is balanced, which increases the radio wave generated in a lateral direction (in parallel with the imaginary plane including the auxiliary antenna). When the auxiliary antenna is larger than the back side conductive layer, the amount of radio wave radiation from the side of the back side conductive layer is rather larger.

The radio wave leaking out in the lateral direction when the auxiliary antenna is as large as the back side conductive layer can facilitate reading (writing) by a reader (writer) even when wireless IC tags are densely arranged, allowing reading (writing) from various angles due to widened radio wave radiation range.

The relation of the size between the auxiliary antenna and the back side conductive layer may be uniform in the whole plane or may vary. Different relations of the size may be combined.

Furthermore, unlike the patch antenna, the sheet body of the invention can use a conductor arranged in the proximity or vicinity as an antenna through electromagnetic coupling to transmit and receive radio wave, so that a conductive object located on the back side conductive layer or in the proximity or vicinity thereof can be used as an antenna.

Intrinsically, when antennas exist, especially arranged side by side with the same resonance frequency, near the wireless IC tag, the antennas affect and degrade antenna characteristic each other. However, when the antennas exist close to each other with the sheet body of the invention interposed therebetween, the antennas do not affect (interfere with) each other, so antenna operation can be transferred to the conductive object located on the back side conductive layer or in the proximity or vicinity thereof. This means that the conductive object (e.g., metal member) located around the wireless IC tag may not be a communication disturbing member, but can be used as an antenna to improve communication. As to this mechanism, since the IC chip of the wireless IC tag is first protected by the opening or notch so as not to be affected by the metal member and the feed matching of the antenna is maintained, it is possible to connect the IC chip and the external antenna through electromagnetic coupling even in non-contact manner or through any conductive portion. As a result, even when the IC chip of the wireless IC tag is used, the antenna for transmitting and receiving radio wave can be selected from among the auxiliary antenna, the back side conductive layer and the conductive object. Typically, when the wireless IC tag is attached to the conductive object, radio wave does not reach the side of the conductive object (in the direction of blind spot in terms of wireless communication from the wireless IC tag) because the conductive object (e.g., metal member) has electromagnetic shielding property. This means that the wireless IC tag cannot wirelessly communicate with a reader on the back of the wireless IC tag. In contrast, according to the invention, the conductive object can be used as an antenna, which eliminates the blind spot and provides a sufficient length of antenna, improving communication properties. The antenna suitable for this operation is not limited to a specific type. For example, a typical dipole antenna may be used.

The resonant length of a dipole antenna is expressed by $(\lambda/2) \times n$ (n: integer), where $\lambda$ is a wavelength at the resonance frequency of the wireless IC tag. Only a portion of the back side conductive layer or the conductive object needs to have this size. When the resonance frequency is high, the size needed for resonance is small, allowing the object to be compact as a whole. For example, the wavelength of 953 MHz band, the frequency authorized for UHF-band RFID, is about 31.5 cm. Then, a conductive object having a length of the integral multiple of a half of the wavelength which is about 15.7 cm, can act as a dipole antenna.

From an ergonomic viewpoint, general tools have a length from half to full of the distance from the palm to elbow of a human and are caused to nip, twist, press or perform the like operation. This length corresponds to the integral multiple of about 14 to 18 cm which is $\lambda/2$ of radio wave at the frequency internationally authorized for UHF-band RFID. Then, since the tools are made of a metal in most cases, a tool itself to which the wireless IC tag and the sheet body of the invention are attached would act as a dipole antenna.

By appropriately changing the shape, the arrangement position of the sheet body or the like of the back side conductive layer and the conductive object, the back side conductive layer and the conductive object can act as a monopole antenna, loop antenna, slit antenna or patch antenna as well as dipole antenna.

Thus, transferring the antenna function to the back side conductive layer or the conductive object and using them as an antenna of the wireless IC tag can eliminate directions in which wireless communication cannot be performed (null zone) to achieve further long-distance communication.

Furthermore, when the back side conductive layer and the conductive object having the antenna function are used to be an outer layer, the outer layer may be made of a metal with high stiffness, easily giving shock resistance to the sheet body and the IC tag for wireless communication.

According to the features described above, even when a communication disturbing member such as a metal, paper, glass, resin or liquid exists near the wireless IC tag, excellent and stable wireless communication properties can be achieved by providing the wireless communication improving sheet body of the invention.

The sheet body of the invention is described below in detail with reference to the drawings.

Figure 2:
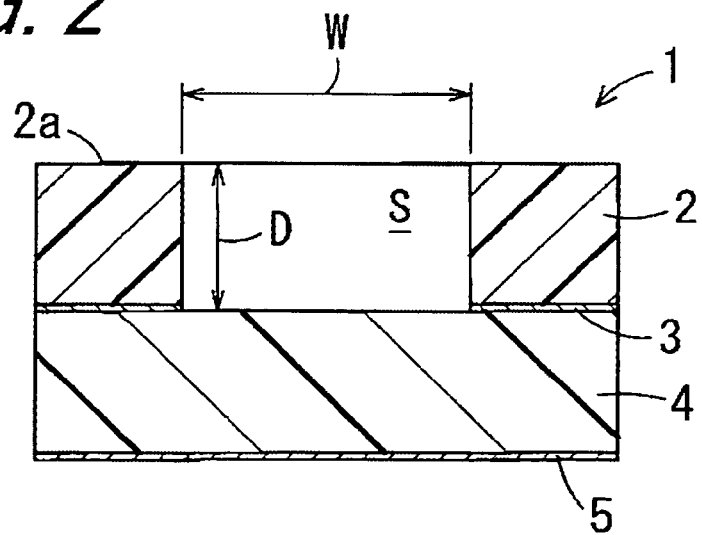
FIG. 2 is an enlarged cross-sectional view of the sheet body 1.

FIG. 1 is a plan view of a sheet body 1 according to a first embodiment of the invention. FIG. 2 is an enlarged cross-sectional view of the sheet body 1.

The sheet body 1 includes a first spacer 2, an auxiliary antenna 3, a second spacer 4 and a back side conductive layer 5, and further includes a groove-shaped notch S provided in the first spacer 2 and the auxiliary antenna 3 and serving as an adjuster for adjusting the resonance frequency.

The first spacer 2 includes an arrangement surface 2a on which a wireless IC tag is arranged when the sheet body is used, and a surface opposite to the arrangement surface 2a thereof is configured to be in contact with the auxiliary antenna 3. The first spacer 2 is composed of a dielectric layer that effects the insulation between a dipole antenna of the wireless IC tag and the auxiliary antenna 3.

The auxiliary antenna 3 resonates at the communication frequency of the wireless IC tag to electromagnetically couple to the dipole antenna of the wireless IC tag and also function in itself as a resonance antenna.

The second spacer 4 is provided on a side opposite to the first spacer with the auxiliary antenna 3 interposed therebetween and is composed of a dielectric layer that effects the insulation between the auxiliary antenna 3 and the back side conductive layer 5.

The back side conductive layer 5 is provided on the side opposite to the auxiliary antenna 3 with the second spacer 4 interposed therebetween and functions as a ground layer.

The first spacer 2, the auxiliary antenna 3, the second spacer 4 and the back side conductive layer 5 have the same external dimension and are stacked in this order to form the sheet body 1.

A planar shape of the sheet body 1 when viewed in the stacked direction is often rectangular, although it depends on the shape of the wireless IC tag to be mounted. The sheet body 1 has a total thickness of about 0.5 to 10 mm.

In the first embodiment, the planar shape of the sheet body 1 is rectangular, and the notch (slit) S is provided having a straight-line shape that is in parallel with the short side direction and open at the center of the long side direction. In the first embodiment, hereinafter, the notch may be occasionally, referred to as "IO-type" and the sheet body 1 may be occasionally referred to as "IO-type sheet body", after the straight-line-shaped notch. The notch S is positioned on an almost center of the sheet body in FIG. 1, but is not limited to the center. The notch S can be positioned appropriately depending on the position of the IC chip and its bonding area of the wireless IC tag and reactance loading area.

As shown in the cross-sectional view in FIG. 2, the notch S cuts through the first spacer 2 and the auxiliary antenna 3 in the stacked direction, and, as a result, the second spacer 4 forms the bottom surface of the groove. Thus, the notch S has a depth D that is equal to the sum of the thicknesses of the first spacer 2 and the auxiliary antenna 3, for example, of 0.05 to 5 mm.

The notch S has a length L that is 3 to 97% of the length L0 in the short side direction of the sheet body 1, for example, of 3 to 97 mm.

The notch S has a width W of, for example, 1 to 90 mm, depending on the size of the IC chip and its bonding area, the reactance loading area, and the like. With the notch S provided, the dipole antenna of the wireless IC tag arranged on the arrangement surface 2a and the auxiliary antenna 3 are electromagnetically coupled by the notch S, which enables the auxiliary antenna 3 to function as a resonance antenna. Furthermore, since the notch S is provided directly underneath the wireless IC tag, the effect on the IC chip given by the auxiliary antenna 3 as conductor can be small.

The first spacer 2 insulates the wireless IC tag and the auxiliary antenna 3, and the second spacer 4 insulates the auxiliary antenna 3 and the back side conductive layer 5. In addition, the first spacer 2 and second spacer 4 as dielectric layers provide an wavelength shortening effect to adjust the resonance frequency of the auxiliary antenna 3. There may be a portion in which the electric field is zero between the auxiliary antenna 3 and the back side conductive layer 5. In this case, the operation can be performed even if the auxiliary antenna 3 and the back side conductive layer 5 are caused to be in conduction with each other, for example, by providing a via in the portion in which the electric field is zero.

As long as the first spacer 2 and the second spacer 4 can maintain the positional relation with the wireless IC tag and auxiliary antenna 3 or the back side conductive layer 5, the first spacer 2 and the second spacer 4 are preferably made of a material with low electromagnetic energy loss, i.e., a material with low dielectric tangent tan $\delta$ ($\in"/\in'$) or low magnetic tangent tan $\delta$ ($\alpha"/\alpha'$) in the communication frequency band. For example, they may be achieved by an air gap. Typically, an organic material as illustrated below may be used.

As the organic material, a polymer organic material such as rubber, thermoplastic elastomer, various plastics, wood or paper can be used. Also, a porous body of them can be used. Examples of the rubber include natural rubber and synthetic rubber alone such as isoprene rubber, butadiene rubber, styrene-butadiene rubber, ethylene-propylene rubber, ethylene-propylene rubber, ethylene-propylene-diene rubber (EPDM rubber), ethylene-vinyl acetate rubber, butyl rubber, butyl halide rubber, chloroprene rubber, nitrile rubber, acrylic rubber, ethylene acrylic rubber, epichlorohydrin rubber, fluororubber, urethane rubber, silicone rubber, chlorinated polyethylene rubber or hydrogenated nitrile rubber (HNBR) and derivative thereof or various modification thereof. These rubbers can be used each alone, or a plurality of them can be used in blending.

Examples of the thermoplastic elastomer include various thermoplastic elastomers such as chlorinated polymers such as chlorinated polyethylene, ethylene copolymers, acrylic polymers, ethylene acrylate copolymers, urethane polymers, ester polymers, silicone polymers, styrene polymers, amide polymers or olefin polymers, and derivative thereof.

Examples of the various plastics include thermoplastic resin and thermosetting resin such as polyethylene, polypropylene, AS resin, ABS resin, polystyrene, chloride resin such as polyvinyl chloride or polyvinylidene chloride, polyvinyl acetate, ethylene-vinyl acetate copolymer, fluororesin, silicone resin, acrylate resin, nylon, polycarbonate, polyethylene terephthalate, alkyd resin, unsaturated polyester, polysulfone, polyimide resin, polyester resin, polyurethane resin, phenolic resin, urea resin and epoxy resin, and derivative thereof, copolymer and recycled resin.

These materials can be used each alone, or used in a compounded or modified manner. For example, fillers such as carbon, graphite, titanium oxide, carbon fiber, carbon tube or graphite fiber can be compounded to increase a dielectric constant. Chemicals, fillers or the like for rubber and plastics can also be used. Furthermore, foamability is preferable. One typical low-density dielectric material is a foamed resin such as foamed polystyrene resin.

Preferably, the dielectric material forming the first spacer 2 and the second spacer 4 have a density of less than 1.0 g/cm$^3$, for example.

For dielectric material having such a low density, one or more materials selected from porous organic materials and porous inorganic materials are used. Non-foamed material may be used. Non-foamed material and foamed material may be combined. In addition to the above, paper such as corrugated cardboard, wood, glass, glass fiber, a soil-based material and the like can be used. Also, the base material and adhesive material layer of the wireless IC tag can be used as a material of the spacer. The adhesive material layer may be provided partially rather than provided on the entire surface. Since the function of the first spacer is sufficiently achieved as long as conduction between the wireless IC tag and the auxiliary antenna is prevented, that is, an air gap may be provided between the wireless IC tag and the auxiliary antenna.

Foaming processes can be classified into adding foaming agent, adding thermally expanding fine particles and the like, for whatever means. Examples of foaming agents include organic foaming agents and inorganic foaming agents.

Examples of the organic foaming agents added include, but are not limited to, dinitrosopentamethylenetetramine (DPT), azodicarbonamide (ADCA), p,p'-oxybisbenzenesulphonyl-hydrazide (OBSH), and hydrazidedicarbonamide (HDCA).

Examples of the inorganic foaming agents added include, but are not limited to, sodium hydrogen carbonate, and may also be selected and added appropriately depending on the material.

Furthermore, examples of the thermally expanding fine particles added include thermally expanding fine particle pellets in the form of a microcapsule.

There is no particular limitation on the foaming ratio, but the foaming ratio has to be determined so that the change in the thickness of an absorber is small, the strength can be maintained, and the weight can be reduced. Thus, the foaming ratio is preferably approximately 2 to 30 times.

There is no particular limitation on the foaming structure, but the foaming structure is preferably determined so that the strength in the compression direction is high, for example, the material is foamed so as to be flat in the thickness direction.

Examples of the wood include a wood material such as plywood, lauan materials, particle board, or MDF. There is no substantial limitation on the material, and a plurality of materials may be combined in use.

Examples of the porous inorganic material include, but are not limited to, various ceramic materials, plasterboard, concrete, foam glass, pumice stone, asphalt, and clay materials.

Since the first spacer 2 and the second spacer 4 need to transform received radio wave energy into transmission energy with as small loss as possible, a material with as small energy loss in the material as possible needs to be selected. In order to do this, at the frequency of electromagnetic wave used for wireless communication by the wireless IC tag, the dielectric tangent tan δ ($\in''/\in'$) is preferably less than 0.5, more preferably less than 0.2.

The spacer material preferably has both a low density and a low dielectric tangent tan δ ($\in''/\in'$), but it is more important for the spacer material to exert a low dielectric tangent tan δ in a communication frequency band (the UHF band, etc.).

Furthermore, if the real part $\in'$ of the complex dielectric constant is high, the sheet can be allowed to be thin and compact. Therefore, $\in'$ is preferably 1 to 50. However, since the sheet is configured with various parameters, $\in'$ is not limited to the above value.

The first spacer 2 and the second spacer 4 may be formed of different dielectric materials or may be formed of the same dielectric material.

The auxiliary antenna 3 and the back side conductive layer 5 are formed of a conductive material.

The conductive material may be a metal such as gold, platinum, silver, nickel, chromium, aluminum, copper, zinc, lead, tungsten or iron, or may be a resin mixture in which a powder of the above metal or conductive carbon black is mixed into a resin, or may be a film of conductive resin or the like. Also, a material in which the above metal or the like is formed in a foil-shape, a plate-shape, a sheet-shape or a film-shape may be used. Alternatively, a metal thin layer with a thickness of, e.g., 600 Å formed on a synthetic resin film may be used. Also, a metal foil transferred to a base material such as film or cloth may be used. Also, a conductive ink based on metal particles (with a resistivity of 10 Ω/sq. or less, for example) may be applied to the first spacer 2 and the second spacer 4.

While the size of the resonance layer of the auxiliary antenna 3 is determined depending on the wavelength corresponding to radio wave having a certain frequency, the size of the back side conductive layer 5 is preferably at least the same as or larger than that of the resonance layer. This intends to reduce as much as possible the effect depending on the type of a product to which the sheet body is attached. When the sheet body is attached to a material having electromagnetic shielding property, namely, a material having the same function as that of the back side conductive layer, for example, the sheet body is attached to only a metal product, the back side conductive layer 5 may be allowed to be omitted.

The notch S can be formed by a commonly-used formation method. For the first spacer 2, a predetermined portion to be an opening or notch can be removed from a plate-shaped member of a dielectric material by mechanical process such as punching or cutting, or chemical process such as etching. Some dielectric materials may be molded into a shape having the opening or notch in advance, in the molding process.

Also for the auxiliary antenna 3, a predetermined portion to be the opening or notch can be removed by mechanical or chemical process in the way similar to that of the first spacer 2. The auxiliary antenna 3 can also be directly printed, evaporated or coated onto the spacer so as to be in a shape having the notch in advance.

Using the methods as described above, the opening or notch may be separately formed in the first spacer 2 and the auxiliary antenna 3 or may be formed at a time in the first spacer 2 and auxiliary antenna 3 that are stacked in advance.

The opening or notch is necessary for the auxiliary antenna 3, but is not always necessary for the back side conductive layer 5. Similarly, the first spacer 2 and the second spacer 4 may or may not have the opening or notch. The invention requires that the opening or notch is provided in the nearest conductive layer.

The shape of the adjuster is not limited to the notch (or slit) shape as in the first embodiment, but may be an opening (or slot) shape. Further, the auxiliary antenna 3 may be divided into a plurality of conductive layers, and a gap between the divided conductive layers may be used as the adjuster.

The shape of the adjuster is not limited as long as the adjuster increases the electric resistance. Also, the dimension of the opening, notch or gap may or may not resonate at the frequency of wireless communication radio wave. The purpose of the adjuster is to adjust the impedance of the IC chip of the wireless IC tag to adjust the resonance frequency of the tag. In order to achieve this purpose, the impedance can be further strongly changed and controlled by giving magnetic permeability and dielectric constant to the adjuster.

Figure 3:
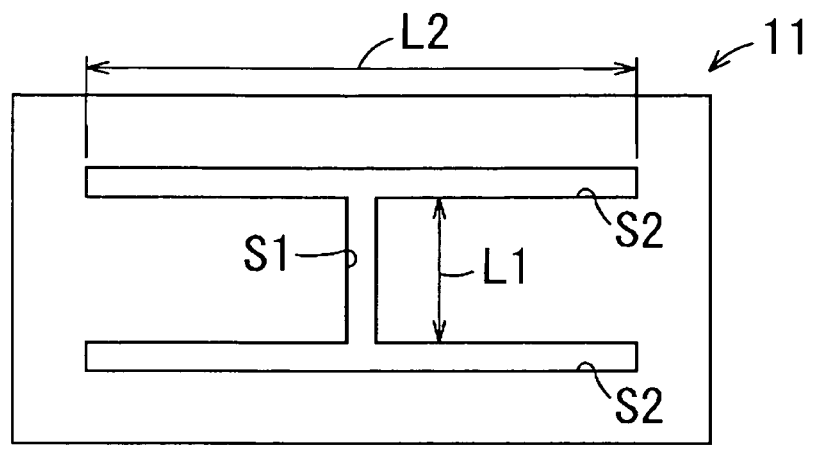
FIG. 3 is a plan view of a sheet body 11 according to a second embodiment of the invention.

FIG. 3 is a plan view of a sheet body 11 according to a second embodiment of the invention. In the second embodiment, the only difference from the first embodiment is the shape of the adjuster. Materials forming the layers of the second embodiment is similar to those of the first embodiment. Thus, only the shape of the adjuster is described below.

Like the first embodiment, In the second embodiment, the planar shape is rectangular. A straight-line-shaped opening S1 is provided in parallel with the short side direction on the center of the long side direction, and two straight-line-shaped openings S2 are provided in parallel with the long side direction at a predetermined interval therebetween in the short side direction. The opening S1 intersects with the openings S2 at the center thereof. The straight-line-shaped opening S1 is provided so as not to run out from the opening S1. In the second embodiment, hereinafter, the openings S2 may be occasionally referred to as "H-type opening S2" and the sheet body 11 may be occasionally referred to as "H-type sheet body", after the shape of the two openings S2 and the opening S1 combining the two openings S2 at the center.

The cross section of the opening S1 and the openings S2 are similar to that shown in the cross-sectional view in FIG. 2 for the first embodiment. The opening S1 and the openings S2 cut through the first spacer 2 and the auxiliary antenna 3 in the stacked direction, and, as a result, the second spacer 4 forms the bottom surface of the groove. The depth and width of the opening S1 and the openings S2 may be different, although they are the same in this embodiment.

The depth D of the openings S2 is the same as the total thickness of the first spacer 2 and the auxiliary antenna 3, and is, for example, 0.1 to 10 mm. The width W of the opening S1 and the openings S2 is, for example, 1 to 90 mm although depending on the size or the like of the IC chip and its bonding area, the reactance loading area, and the like.

The length L1 of the opening S1 is, for example, 5 to 100 mm, and the length L2 of the openings S2 is, for example, 30 to 200 mm.

With the opening S1 and openings S2 provided, the dipole antenna or IC chip of the wireless IC tag arranged on the arrangement surface 2a and the auxiliary antenna 3 are electromagnetically coupled by the opening S1 and openings S2, which enables the auxiliary antenna 3 to function as a resonance antenna. Furthermore, since the opening S1 is provided directly underneath the wireless IC tag, and the openings S2 are provided in the loop part of the dipole antenna, the effect on the IC chip and loop part (reactance loading area) given by the auxiliary antenna 3 as conductor can be small.

Next, a function of the adjuster that adjusts the resonance frequency is described.

Figure 4:
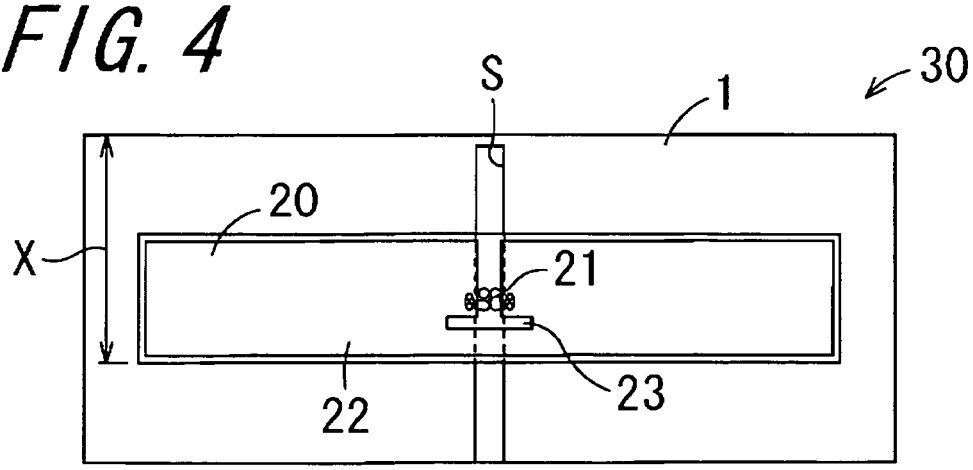
FIG. 4 is a plan view of an IC tag for wireless communication 30 in which a wireless IC tag 20 is arranged on the sheet body 1.
Figure 5:
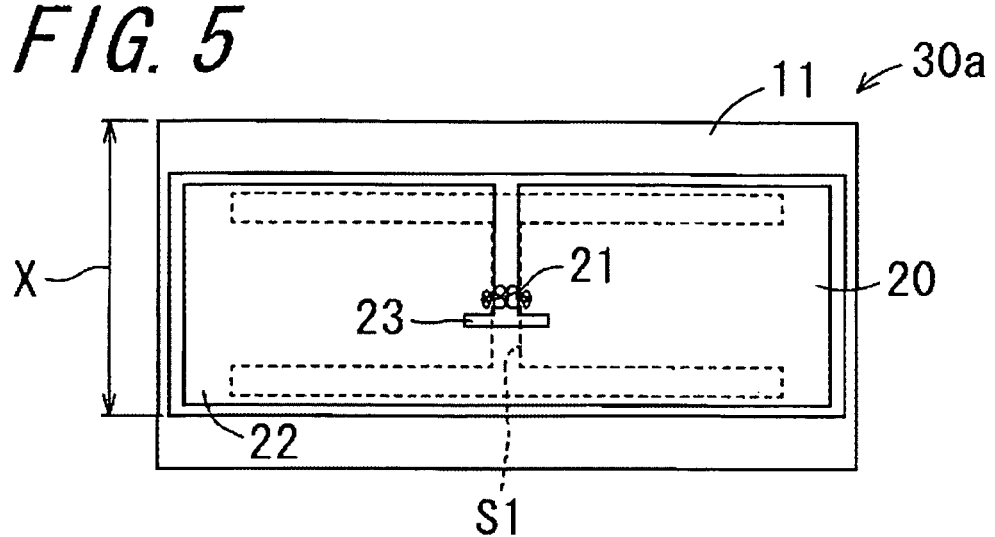
FIG. 5 is a plan view of an IC tag for wireless communication 30a in which the wireless IC tag 20 is arranged on the sheet body 11.

FIG. 4 is a plan view of an IC tag for wireless communication 30 in which a wireless IC tag 20 is arranged on the sheet body 1. FIG. 5 is a plan view of an IC tag for wireless communication 30a in which the wireless IC tag 20 is arranged on the sheet body 11. The base material of the wireless IC tag 20 may be arranged on the upper or lower side of the wireless IC tag 20.

As described above, on the arrangement surface 2a of the first spacer 2 of the sheet body 1, 11, the wireless IC tag 20 is arranged without wire connection to the sheet body 1, 11. The language "arranged without wire connection" means that the sheet body 1, 11 and the wireless IC tag 20 are not in direct conduction (DC-coupling) with each other by conductive wiring or the like, but the wireless IC tag 20 is placed on the arrangement surface 2a of the first spacer 2.

The wireless IC tag 20 includes an IC chip 21 for storing identification information, and an antenna 22 connected with the IC chip 21, for receiving/transmitting radio wave from/to a reader.

As shown in FIGS. 4 and 5, the wireless IC tag 20 is arranged on the sheet body 1, 11 such that the IC chip 21 is opposite to the notch S or opening S1 provided in the auxiliary antenna 3 or at least opposite to a loop-shaped notch 23 (reactance loading area) of the antenna 22 as reactance loading area.

For the IC for wireless communication 30, the resonance frequency of the wireless IC tag 20 can be changed by changing the position of the IC chip 21 or the loop-shaped notch 23 with respect to the notch S.

For the IC for wireless communication 30a, the resonance frequency of the wireless IC tag 20 can be changed by changing the position of the IC chip 21 or the loop-shaped notch 23 with respect to the opening S1.

That is, by changing the arrangement position at which the wireless IC tag 20 is arranged on the surface of the sheet body 1, 11, the resonance frequency of the wireless IC tag 20 can be changed and adjusted to a desired frequency. This intends to adjust the impedance (determined by the ratio of electric field and magnetic field) in the space or medium around the adjuster, then perform impedance matching with the wireless IC tag 20, in particular, the IC chip 21, and then transmit/receive information as electromagnetic energy. Since the impedance also has frequency dependence, the resonance frequency of the wireless IC tag 20 can be adjusted as a result. As described later in an example, the resonance frequency is changed only by adjusting the impedance of the adjuster without changing the size of the auxiliary antenna (i.e., resonance antenna). This effect is also essential for a wireless IC tag for multi-frequency band use.

In this embodiment, the arrangement position of the wireless IC tag 20 is defined as a distance X from one long side of the sheet body to the farther long side of the wireless IC tag 20.

For either the IO-type sheet body 1 or the H-type sheet body 11, the resonance frequency can be adjusted by changing the arrangement position.

As described in detail later, for the IO-type sheet body 1, the frequency band is sharp, and the change in frequency with respect to the change in the arrangement position is large, so that the adjustment sensitivity is high. Also, the communication properties are high and the possible communication distance is long. For the H-type sheet body 11, the frequency band is wide, and the change in frequency with respect to the change in the arrangement position is small, so the adjustment sensitivity is low. Although the communication properties are lower than those of the IO-type sheet body 1, the capability of improving communication is sufficiently provided.

Thus, when large change in resonance frequency is needed with high adjustment sensitivity, the IO-type sheet body 1 is preferable. When small change in resonance frequency with respect to a little deviation of the arrangement position is needed with low adjustment sensitivity, the H-type sheet body 11 is preferable.

The relation between the arrangement position of the wireless IC tag 20 and the resonance frequency can be established in advance based on actual measurement or the like. Thus, for example, when the communication frequency of the wireless IC tag 20 is predetermined for each country, the arrangement position corresponding to the predetermined communication frequency is selected based on the established relation, then the wireless IC tag 20 is arranged at the selected arrangement position.

Thus, according to the invention, the resonance frequency can be adjusted only by changing the arrangement position of the wireless IC tag 20, without changing the dimension and material of the antenna as in the patch antenna, which can provide the sheet body that can be applied to a plurality of communication frequencies.

Figure 6:
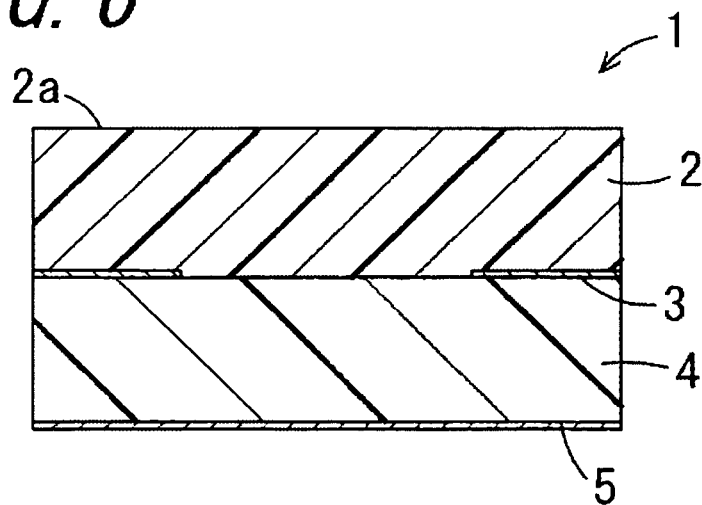
FIG. 6 is an enlarged sectional view of a sheet body 1 according to another embodiment of the invention.

FIG. 6 is an enlarged sectional view of a sheet body 1 according to another embodiment of the invention. In the above-described embodiments, such a structure is described that the first spacer 2 and the auxiliary antenna 3 is provided with the notch S or opening S1 as the adjuster so that the second spacer 4 forms a bottom of the notch or opening. Alternatively, the opening, notch or gap may be provided only in the auxiliary antenna 3 without providing the opening or notch in the first spacer 2.

For a manufacturing method according to this embodiment, the first spacer 2 without the opening or notch provided therein may be attached to the auxiliary antenna 3 with the opening, notch or gap as the adjuster provided therein. Further, after the opening, notch or gap have been provided in the first spacer 2 and the auxiliary antenna 3, the opening, notch or gap may be filled.

Figure 7A:
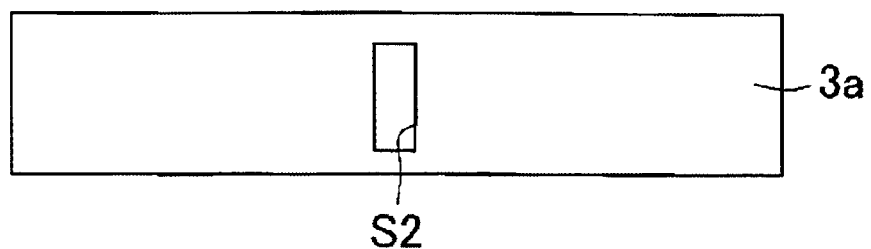
FIGS. 7A and 7B are plan views showing auxiliary antennas of still another embodiments of the invention.
Figure 7B:
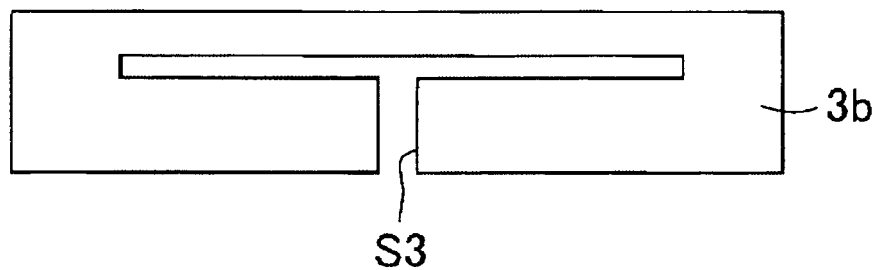

FIGS. 7A and 7B are plan views showing auxiliary antennas according to still another embodiments of the invention. FIG. 7A shows the embodiment in which the notch S of the first embodiment is modified, and a straight-line-shaped opening S2 is provided in an auxiliary antenna 3a, instead of the notch S. FIG. 7B shows an auxiliary antenna 3b in which a straight-line-shaped notch in parallel with the short side direction intersects with a groove-shaped opening in parallel with the long side direction at the center, the straight-line-shaped notch being provided so as not to run out from the opening.

The shape and number of the opening, notch or gap provided as the adjuster to the auxiliary antenna are not limited to those shown in the drawings. A plurality of opening may be provided. Any combination of the opening, notch or gap may be provided. The opening, notch or gap may have such a shape that completely divides the auxiliary antenna. Also, the shape of the opening, notch or gap is not limited to a polygonal-shape, but may be in any shape such as a line-, bar-, circular-, arc-, curved- or irregular-shape. These may be distributed in the vertical direction.

In the above-described sheet bodies, in order to mount the wireless IC tag on the arrangement surface 2a and cause the surface opposite to the arrangement surface to be attached to a target product, at least one of these surfaces preferably has a sticker or adhesive. This facilitates mounting the wireless IC tag and attaching the sheet body to the target product. The method for attaching the sheet body to the target product is not limited to this method. The attachment of the sheet body to the target product may also be performed by using a fixture or magnet, fitting or pressing with a tape or the like. For example, a binding band may be used for securing. Specifically, the binding band may be used to cover the outer surface of the sheet body 1 on which the wireless IC tag is arranged, to secure the sheet body to the target, in which the binding band functions as a protection material to improve shock resistance. Also, when attaching the sheet body 1 to a curved surface using a sticker or adhesive is difficult, the binding band may be used for mechanically securing the sheet body 1.

Part or entirety of the outer surface of the IC tag for wireless communication 30 is preferably covered with a dielectric material. For the covering material, the materials listed as the materials for the first and second spacers can be used as they are. A combination of polymer and fiber or other composite materials are often used. Particularly, a material suitable for giving environmental resistance, endurance, shock resistance and insulation is selected to be processed for covering.

Figure 8:
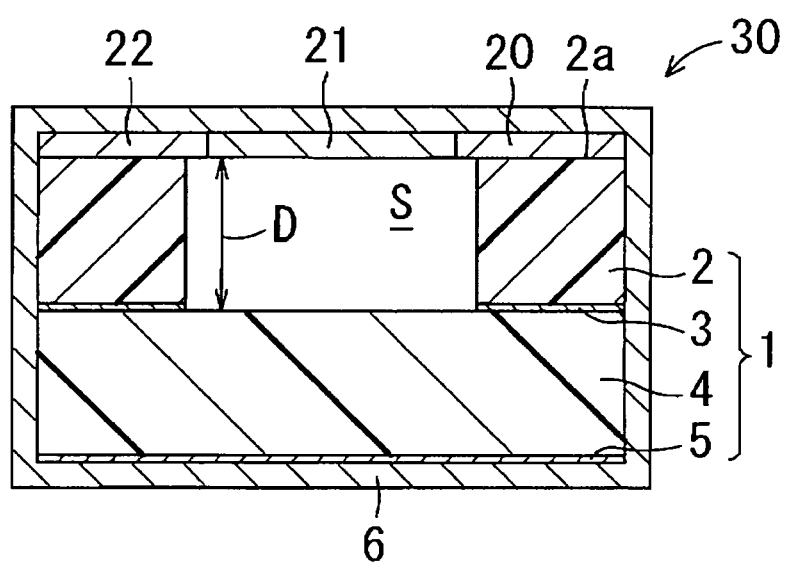
FIG. 8 is a cross-sectional view showing the structure of an IC tag for wireless communication 30 covered with a covering layer 6.

FIG. 8 is a cross-sectional view showing the structure of an IC tag for wireless communication 30 covered by a covering layer 6.

The IC tag for wireless communication 30 of this embodiment is an object comprising the sheet body 1, the wireless IC tag 20 attached to the sheet 1, and the covering layer 6 with which an assembly of the sheet 1 and the wireless IC tag 20 is covered.

The dielectric material used for the covering layer 6 has a dielectric tangent tan $\delta$ (953 MHz) of 0.05 or less. When the covering layer 6 is formed of a dielectric material with tan $\delta$ of more than 0.05, molding the covering layer 6 causes the possible communication distance of the wireless IC tag 20 to be short. This may be because, when radio wave transmitted/received by the wireless IC tag 20 passes through the covering layer 6, an energy loss occurs to shorten the possible communication distance. For the dielectric material, the real part $\in'$ of the complex dielectric constant (953 MHz) is preferably 1 to 20 in order to reduce the thickness of the covering layer 6.

Examples of materials suitable for the covering layer 6 include EVA (ethylene-vinyl acetate copolymer) resin, PET (polyethylene terephthalate) resin, polycarbonate resin, polyethylene resin and polypropylen resin. EVA resin has tan $\delta$ (953 MHz) of 0.01 and $\in'$ (953 MHz) of 2.39. PET resin has tan $\delta$ (953 MHz) of 0.01 and $\in'$ (953 MHz) of 2.9.

The covering of the sheet body 1 and wireless IC tag 20 with the covering layer 6 can be performed using known welding techniques. The welding techniques include impulse welding, hot plate welding, high-frequency welding, ultrasonic welding and the like, classified according to the way of heating a member. Also, injection molding, compression molding, transfer molding, casting, dipping, soaking or other appropriate molding methods can be used.

Mounting the wireless IC tag on the sheet body 1 of the invention provides an IC tag for wireless communication providing wireless communication properties using radio wave as good as would be provided in free space even when the wireless IC tag is attached to a material that is a communication disturbing member such as conductive material, dielectric material, or magnetic material. Also, attaching IC chip to the sheet body 1 enables the sheet body 1, as it is, to function as the IC tag for wireless communication. This IC tag for wireless communication can also provide wireless communication properties as good as would be provided in free space even when attached to a communication disturbing member. The communication frequency usable in the invention includes, but is not particularly limited to, a range of 300 MHz to 300 GHz, in which any single or multiple frequencies can be selected. The range of 300 MHz to 300 GHz includes an UHF band (300 MHz to 3 GHz), an SHF band (3 GHz to 30 GHz) and an EHF band (30 GHz to 300 GHz). Also, wireless communication for an antenna that performs radio wave communication in the above frequency range is improved.

It is possible to use an information transmitting medium such as a slip, certificate, card or label into which the sheet body or IC tag for wireless communication of the invention is built. These slips are still actively used on the fields of physical distribution, logistics, distribution, inventory control, process control and the like, as documented work instructions, request, purchase order, delivery slip, tag table, pay slip, Kanban card and the like. But, conventional type of slips with a general-purpose wireless IC tag built therein or attached thereto cannot be attached to the above-described communication disturbing member. However, in actual manufacturing industries, so many materials including communication disturbing members exist around the environment in which an IC tag is used. The sheet body, IC tag for wireless communication or the like of the invention can perform wireless IC tag communication even when attached, in the form of Kanban card, slip, certificate, card or label, directly to a product, interim product, part or material including a communication disturbing member such as metal, conductive or high-dielectric materials, or a vessel, carrier, palette, vehicle, forklift, container, bag, wrapper, case, returnable box or conductive box including any of the above-described materials. This expands the range of target products in the fields of physical distribution management, inventory management, distribution management, information management and the like. Also, exportation and importation management can be easily performed since the IC tag for wireless communication is applied to international frequencies of RFID facilitates.

Figure 9:
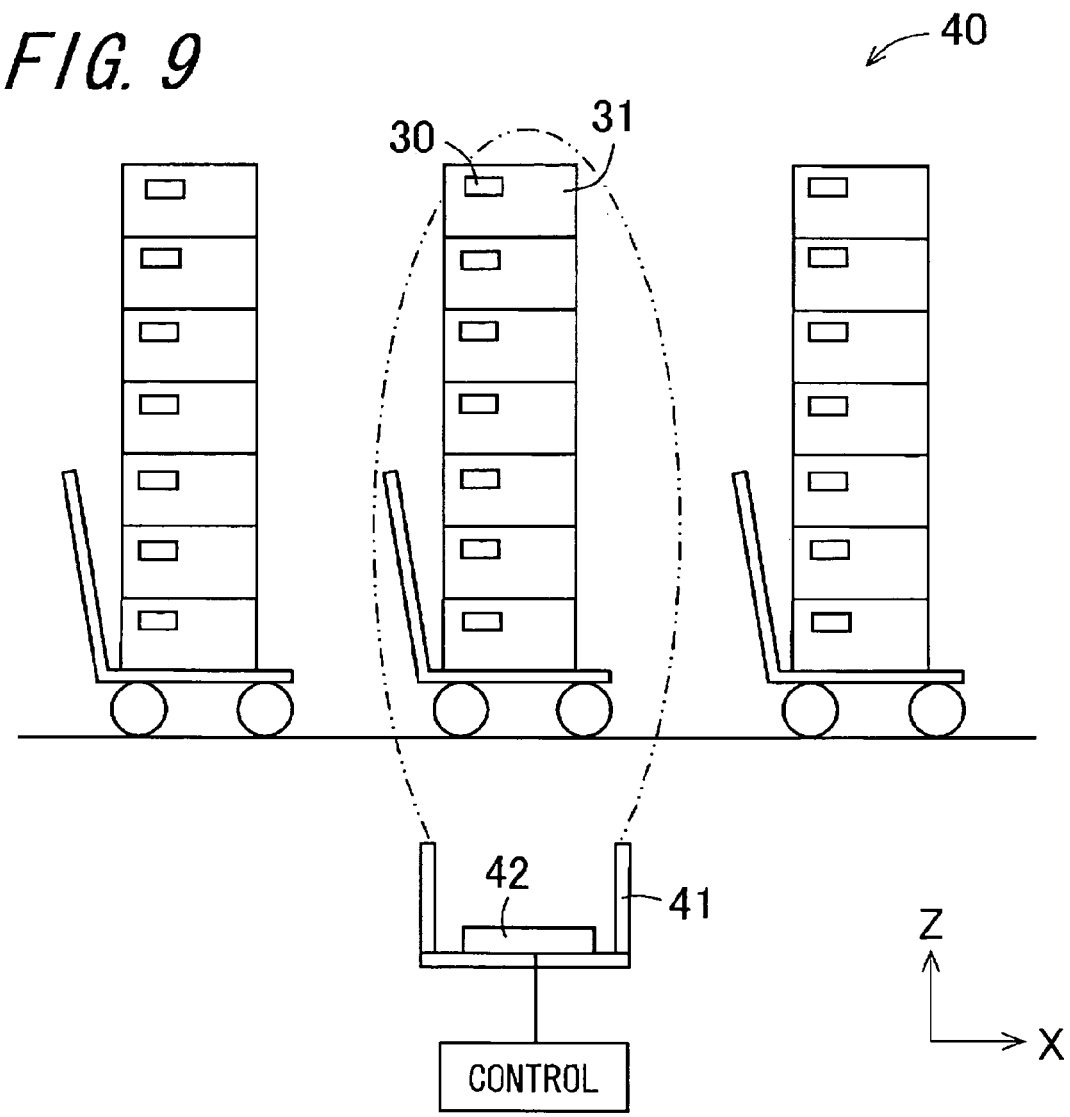
FIG. 9 is a view showing an example of a wireless communication system 40.

Still another embodiment of the invention is a wireless communication system. An example of the wireless communication system may be an RFID wireless communication system 40 as show in FIG. 9 in which a wireless IC tag 30 is attached to each of a plurality of metallic containers 31, then information reading/writing is performed by causing the plurality of metallic containers 31 in block to pass through an antenna gate section 41 with a reader 42 provided therein. Another example may be an RFID wireless communication system in which the wireless IC tag 30 is attached to each of a plurality of metallic objects, then the objects are sequentially carried on a conveyor (at regular intervals), and then physical distribution management (entering and dispatching from warehouse) or traceability management is performed on the objects in the antenna gate section provided at a given location. Furthermore, optimizing the dimension of the back side conductive layer of the wireless IC tag 30 and controlling the radio wave radiation range allows wireless communication even when the reader is arranged in the lateral direction of the wireless IC tag 30. For example, a system is possible in which the wireless IC tag 30 is attached to the side face of a tubular metallic object such as a neck portion of a gas canister and a reader antenna is arranged on the upper portion of the object. Furthermore, the wireless IC tag 30 may be attached to a tool to perform RFID management. Information to be transmitted can include, in addition to a product ID, not only historical information and special information but also documented work instructions, request, delivery slip, purchase order and the like. For example, the information may include inventory management data or cost management data to improve productivity, e.g., enhance yield or reduce cost.

Now, examples of the invention are described.

EXAMPLES

IC tags for wireless communication were manufactured by making the IO-type sheet body 1 and the H-type sheet body 11 to which a wireless IC tag was attached, respectively.

First, as Example 1, the IO-type sheet body was manufactured to measure the frequency characteristic of a starting power of the wireless IC tag with respect to the changed arrangement position of the wireless IC tag.

The IO-type sheet body had external dimensions of 40 mm by 100 mm. A PET (polyethylene terephthalate) film with a thickness of 0.1 mm was used for the first spacer 2. An aluminum foil layer with a thickness of 0.05 mm was used for the auxiliary antenna 3. The notch S had a length L of 30 mm and a width W of 6 mm. A foamed material (an expansion ratio of 5) with a thickness of 2 mm was used for the second spacer 4.

The arrangement positions of the wireless IC tag were set to X=29 mm, 30 mm, 31 mm, 32 mm.

The frequency characteristic of the starting power was measured with an RFID tester from Peritec Corporation.

Figure 10:
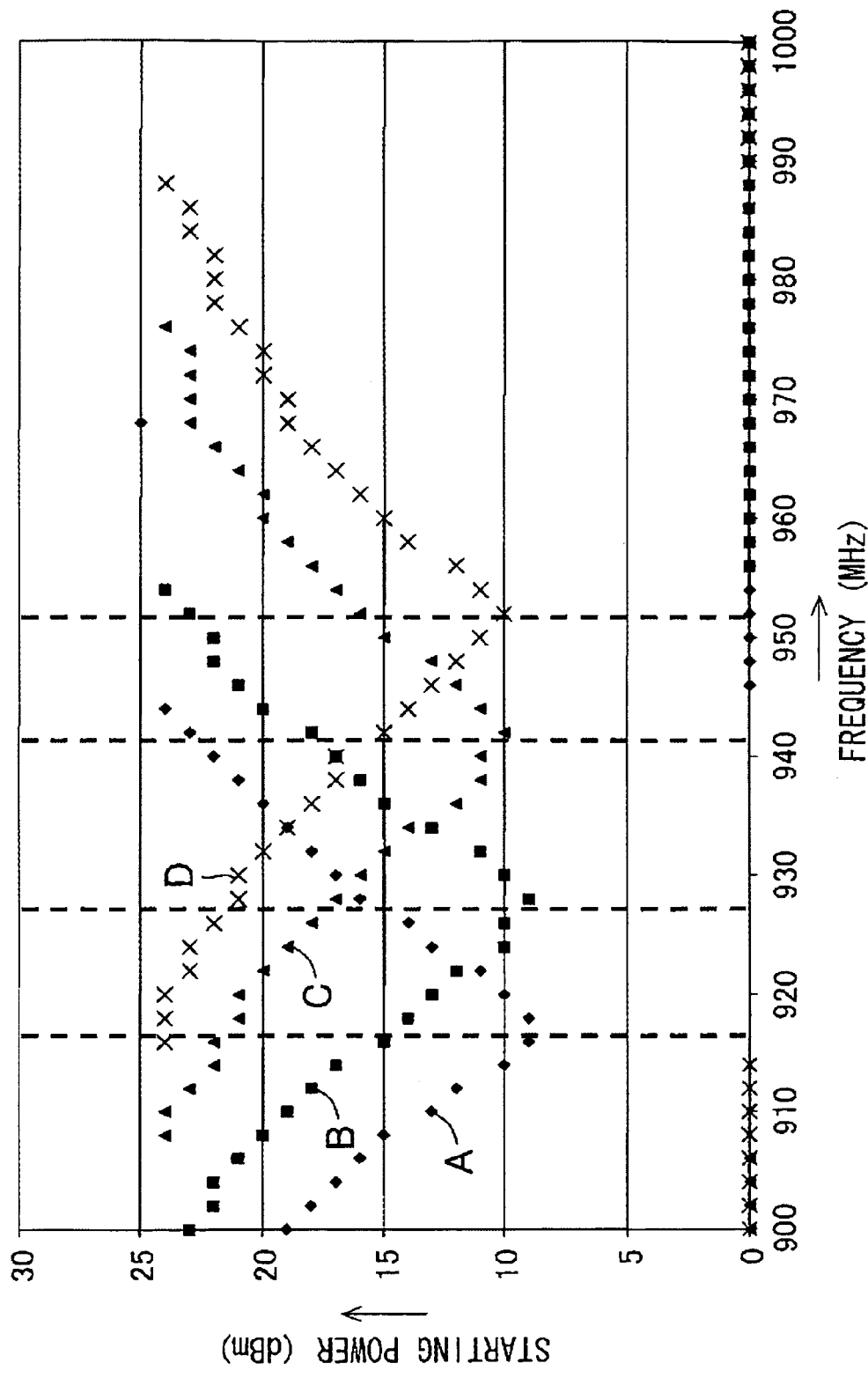
FIG. 10 is a graph showing the frequency characteristic of a starting power of Example 1.

FIG. 10 is a graph showing the frequency characteristic of the starting power of Example 1. The horizontal axis indicates the frequency (MHz). The vertical axis indicates the starting power (dBm). Plot A is for X=29 mm. Plot B is for X=30 mm. Plot C is for X=31 mm. Plot D is for X=32 mm.

As seen from the graph, when the arrangement position X was changed, the resonance frequency changed. The resonance frequency is a frequency at which the starting power is at its minimum.

For X=29 mm, the peak of the resonance frequency was 917 MHz. For X=30 mm, the peak of the resonance frequency was 928 MHz. For X=31 mm, the peak of the resonance frequency was 942 MHz. For X=32 mm, the peak of the resonance frequency was 952 MHz.

The possible communication distance was measured when a reader for the communication frequency in Japan (952 to 954 MHz) Was used and when a reader for the communication frequency in Korea (910 to 915 MHz) was used. As the reader for Japan, a V750-BA50C04-JP manufactured by OMRON Corporation (measuring power=22.5 dBm) was used. As the reader for Korea, an AT570 from ATID Company (measuring power=28.0 dBm) was used. The measurement was performed in a radio wave anechoic chamber. The result is shown in Table 1.

TABLE 1

| | | | | |
|---|---|---|---|---|
| Arrangement position (mm) | 29 | 30 | 31 | 32 |
| Resonance frequency (MHz) | 917 | 928 | 942 | 952 |
| Possible communication distance with reader for Japan (mm) | 350 | 530 | 870 | 1670 |
| Possible communication distance with reader for Korea (mm) | 2490 | 1270 | 700 | 380 |

Next, as Example 2, the H-type sheet body was manufactured to measure the frequency characteristic of a starting power of the wireless IC tag with respect to the changed arrangement position of the wireless IC tag.

The H-type sheet body had external dimensions of 40 mm by 105 mm. A foamed material (an expansion ratio of 5) with a thickness of 1 mm was used for the first spacer 2 and second spacer 4. An aluminum foil layer with a thickness of 0.05 mm was used for the auxiliary antenna 3. The opening S1 had a length L1 of 22 mm and a width W of 6 mm. The openings S2 had a length L2 of 75 mm and a width W of 6 mm.

The arrangement positions of the wireless IC tag were set to X=29 mm, 30 mm, 31 mm, 32 mm.

Similarly to Example 1, the frequency characteristic of the starting power was measured with the RFID tester from Peritec Corporation.

Figure 11:
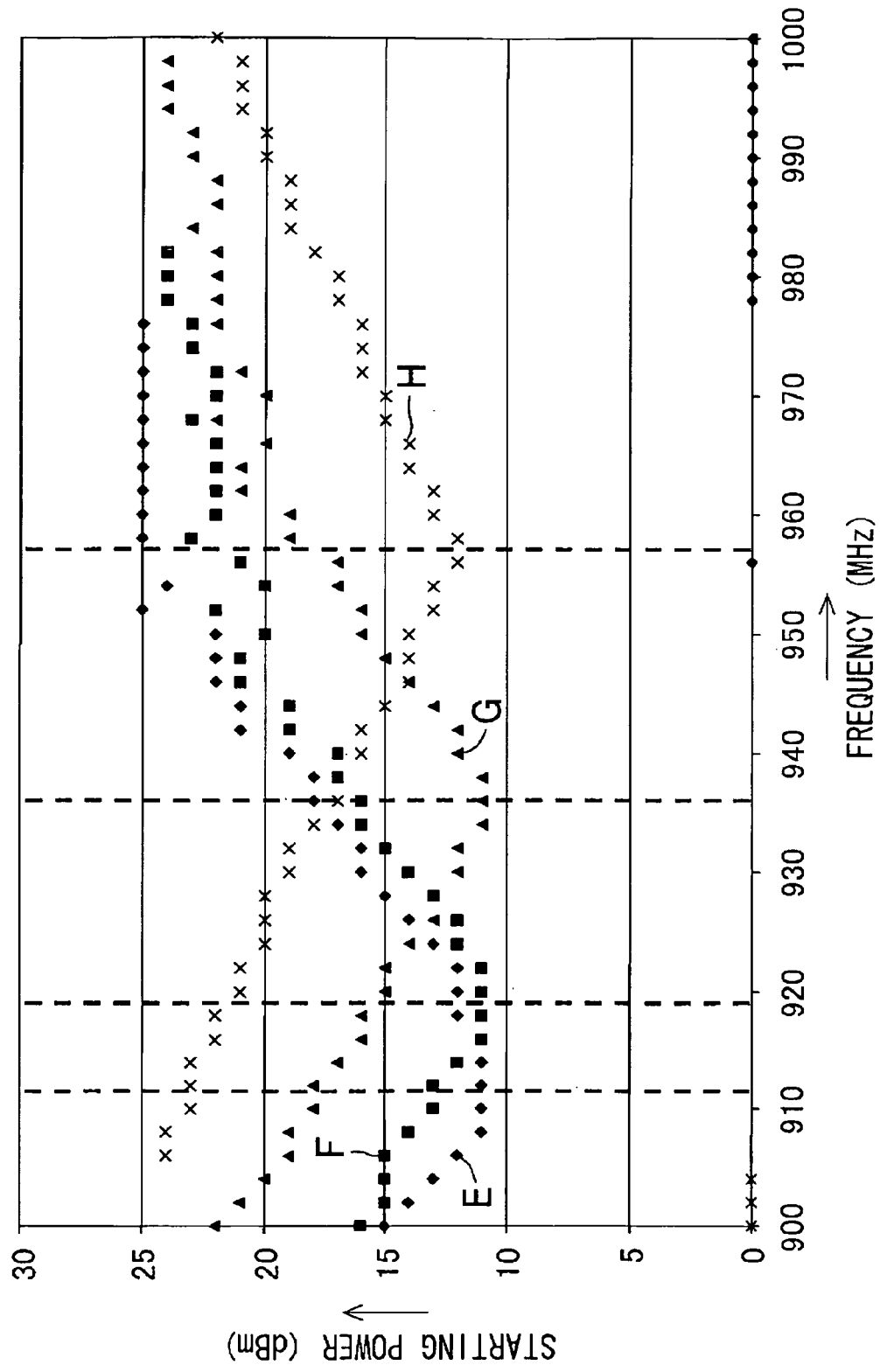
FIG. 11 is a graph showing the frequency characteristic of a starting power of Example 2.
Figure 12:
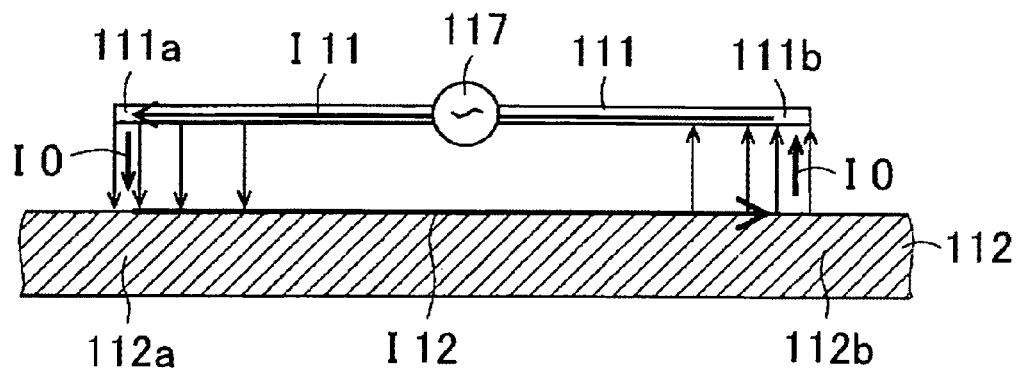
FIG. 12 is a cross-sectional view showing a magnetic field generated near the wireless IC tag 20 that is located close to a conductive member.

FIG. 11 is a graph showing the frequency characteristic of a starting power of Example 2. The horizontal axis indicates the frequency (MHz). The vertical axis indicates the starting power (dBm). Plot E is for X=29 mm. Plot F is for X=30 mm. Plot G is for X=33 mm. Plot H is for X=39 mm.

As seen from the graph, when the arrangement position X was changed, the resonance frequency changed. The resonance frequency is a frequency at which the starting power is at its minimum.

For X=29 mm, the resonance frequency was 914 MHz. For X=30 mm, the peak of the resonance frequency was 918 MHz. For X=33 mm, the peak of the resonance frequency was 936 MHz. For X=39 mm, the peak of the resonance frequency was 956 MHz.

Similarly to Example 1, the possible communication distance was measured when the reader for the communication frequency in Japan (952 to 954 MHz) was used and when the reader for the communication frequency in Korea (910 to 915 MHz) was used. The result is shown in Table 2.

TABLE 2

| Arrangement position (mm) | 29 | 30 | 33 | 39 |
|---|---|---|---|---|
| Resonance frequency (MHz) | 914 | 918 | 936 | 956 |
| Possible communication distance with reader for Japan (mm) | 700 | 750 | 1170 | 2150 |
| Possible communication distance with reader for Korea (mm) | 2050 | 2000 | 1650 | 800 |

From the above results, it was seen that, when the IO-type sheet body and H-type sheet body were used, the possible communication distance increases as the resonance frequency approaches the communication frequencies for Japan and Korea, and the possible communication distance decreases as the resonance frequency becomes away from the communication frequencies. This shows that these sheet bodies allow the wireless IC tag to be used with different communication frequencies just by changing the arrangement position of the wireless IC tag.

Furthermore, as Example 3, the sheet body with an opening (slot) as the adjuster provided therein was manufactured, then the IC tag was attached to the sheet body to provide the IC tag for wireless communication. Then, the effect on the possible communication distance given by the size of the back side conductive layer 5 changed with respect to that of the auxiliary antenna 3 was investigated.

The sheet body had external dimensions of 16 mm by 98 mm. A PET (polyethylene terephthalate) film with a thickness of 0.1 mm was used for the first spacer 2. An aluminum foil layer with a thickness of 0.05 mm was used for the auxiliary antenna 3. The opening S had a length L of 29 mm and a width W of 12 mm. Polyethylene with a thickness of 3 mm was used for the second spacer 4.

Figure 13:
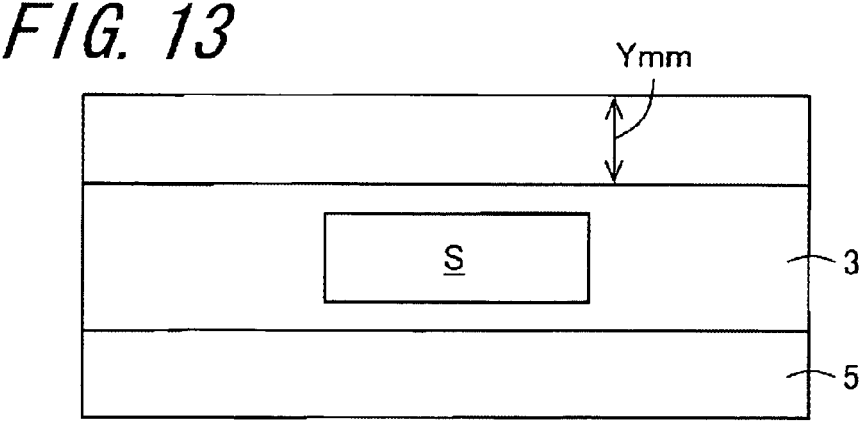
FIG. 13 is a plan view of a sheet body of Example 3.

The possible communication distance was measured with the size of the back side conductive layer 5 changed with respect to that of the auxiliary antenna 3. The size of the auxiliary antenna 3 was fixed equal to that of the first and second spacers. Only the size of the back side conductive layer 5 was changed. In addition, as shown in a plan view of FIG. 13, the back side conductive layer 5 was provided so as to protrude from underneath the auxiliary antenna 3 uniformly on both sides of the auxiliary antenna 3 in the short side direction thereof. The amount of protrusion on one side in the short side direction was expressed by Y (mm).

Figure 14:
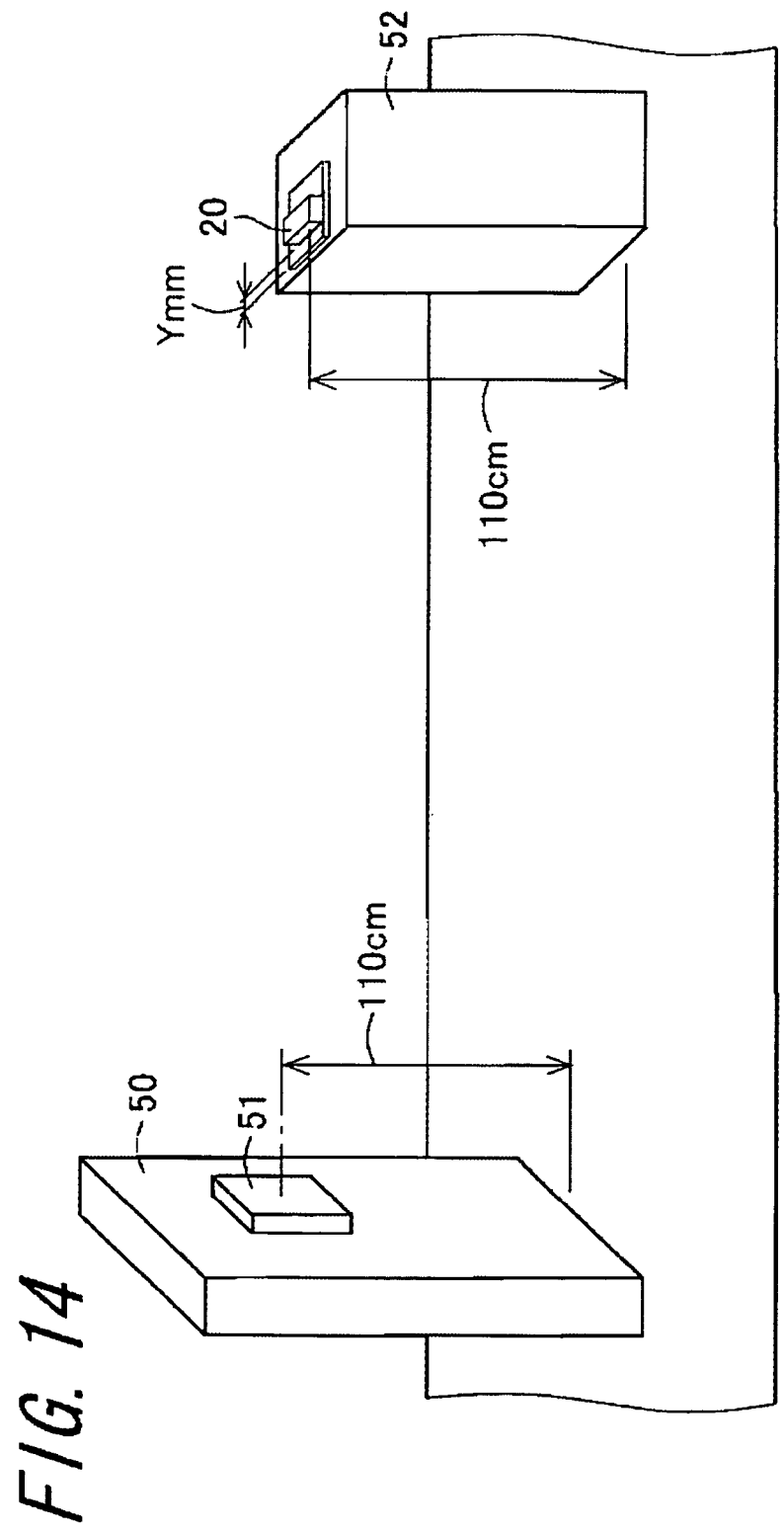
FIG. 14 is a view showing a method of measuring a possible communication distance.

Table 3 shows the possible communication distance when the amount of protrusion Y is 0, 10, 20, 30, 40 and 50 mm. A method of measuring the possible communication distance in this example is shown in FIG. 14. In this method, a reader/writer 51 targeting the wireless IC tag was attached to the side face of a foamed body 50 (at a height of 110 cm), then the wireless IC tag 20 was arranged on the top face of a foamed body 52 (at a height of 110 cm), and then the distance between the reader/writer 51 and the wireless IC tag 20 was changed by moving the foamed body 52. The wireless IC tag 20 was arranged so that the side from which the back side conductive layer 5 protrudes is directed toward the reader/writer 51.

TABLE 3

| | Amount of protrusion Y (mm) | | | | | |
|---|---|---|---|---|---|---|
| | 0 | 10 | 20 | 30 | 40 | 50 |
| Possible communication distance with reader for Japan (mm) | 1880 | 1700 | 1450 | 1200 | 1070 | 970 |

As shown in Table 3, the possible communication distance decreased as the amount of protrusion of the back side conductive layer 5 increased. This shows that the radiation range, i.e., directivity of the wireless IC tag 20 changed. Thus, it is seen that the radio wave radiation range of the wireless IC tag 20 can be controlled by changing the size of the auxiliary antenna 3 and back side conductive layer 5.

Furthermore, as Example 4, the wireless IC tag 20 of Example 3 was attached to a spanner, a conductive object.

The spanner was made of iron and had a length of 160 mm. The wireless IC tag 20 was attached to the center of the handle part of the spanner along the longitudinal direction to be used as a tool for Example 4.

The spanner was arranged so that the longitudinal direction was in parallel with the vertical direction. Then, the possible communication distance was measured while changing the reading position of the reader by 30° step on a horizontal plane at the same height as the wireless IC tag 20.

The position when the reader is opposite to the wireless IC tag 20 was defined to be a reading position of 0°. Accordingly, a reading position of 180° is just behind the wireless IC tag 20.

In addition, as Comparative Example, the wireless IC tag 20 was attached to an SUS plate of 150 mm by 66 mm. Similarly to Example 4, for Comparative Example, the position when the reader is opposite to the wireless IC tag 20 was defined to be a reading position of 0°, then the possible communication distance was measured while changing the reading position by 30° step.

FIG. 15 shows the measurement results for Example 4 and Comparative Example. According to the measurement results for Comparative Example indicated by a broken line in FIG. 15, the possible communication distance was generally short, and, in particular, the possible communication distance was zero when the reading position was in the range of from 90° to 270°, that is, when the reader was behind the SUS plate to which the wireless IC tag 20 was attached.

In contrast, according to the measurement results for Example 4 indicated by a solid line in FIG. 15, the possible communication distance was generally longer than that of Comparative Example, and the possible communication distance was almost constant at any reading position of 0° to 360°.

Thus, it was seen that, when the wireless IC tag was attached to a conductive object such as spanner, the conductive object itself functioned as an antenna, eliminating null zone in which wireless communication cannot be performed and allowing further long distance communication.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1, 11 Sheet body
2 First spacer
3 Auxiliary antenna
4 Second spacer
5 Back side conductive layer
6 Covering layer
20 Wireless IC tag
21 IC chip
22 Antenna
30 IC tag for wireless communication
40 Wireless communication system

The invention claimed is:

1. A method for manufacturing an IC tag for wireless communication, comprising arranging a wireless IC tag or wireless IC tag component on an arrangement surface of a wireless communication improving sheet body to manufacture the IC tag for wireless communication, the method comprising:

providing the wireless communication improving sheet body capable of improving wireless communication properties of the wireless IC tag or wireless IC tag component mounted thereon;

determining an arrangement position of the wireless IC tag or wireless IC tag component with respect to an adjuster of the wireless communication improving sheet body according to a communication frequency of the wireless IC tag; and arranging the wireless IC tag or wireless IC tag component at the arrangement position determined without wire connection to the wireless communication improving sheet body, the wireless communication improving sheet body comprising:

a first spacer having the arrangement surface on which the wireless IC tag or wireless IC tag component is arranged without the wire connection;

an auxiliary antenna provided on a surface opposite to the arrangement surface of the first spacer; and a second spacer provided opposite to the first spacer with the auxiliary antenna interposed therebetween so that the first spacer, the auxiliary antenna and the second spacer stack one another, the auxiliary antenna being provided with an opening or notch which is served as the adjuster for adjusting resonance frequency of the wireless IC tag; and wherein determining the arrangement position further includes achieving impedance matching and resonance frequency adjustment of radio wave signals between the auxiliary antenna and an IC chip of the wireless IC tag or wireless IC tag component via electromagnetic field distribution in the adjuster without a conductive connection.

2. The IC tag for wireless communication manufactured by the method of claim 1.

* * * * *